United States Patent

Kosinski et al.

Patent Number: 6,050,109
Date of Patent: *Apr. 18, 2000

[54] METHOD FOR MAKING LONG-PERIOD FIBER GRATINGS

[75] Inventors: Sandra Greenberg Kosinski, Murray Hill, N.J.; Gregory Alexander Ten Eyck, Great Falls, Va.; Ashish Madhukar Vengsarkar, Berkeley Heights, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/740,826

[22] Filed: Nov. 4, 1996

[51] Int. Cl.[7] .................................. C03B 37/10
[52] U.S. Cl. .................. 65/385; 65/425; 65/111
[58] Field of Search ............... 65/425, 385, 111

[56] References Cited

U.S. PATENT DOCUMENTS

| | | |
|---|---|---|
| 4,804,248 | 2/1989 | Bhagavatula ............. 65/408 |
| 4,867,776 | 9/1989 | Sharp ........................ 65/387 |
| 4,946,250 | 8/1990 | Gonthier . |
| 5,411,566 | 5/1995 | Poole ......................... 65/402 |
| 5,495,548 | 2/1996 | Bilodeau ................... 65/386 |

FOREIGN PATENT DOCUMENTS

| | | |
|---|---|---|
| 736784 | 9/1996 | European Pat. Off. . |
| 58-91403 | 5/1983 | Japan ........................ 65/425 |
| 58-108502 | 6/1983 | Japan ........................ 65/425 |

OTHER PUBLICATIONS

Dianov, et al, Thermo–induced Long–Period Fibre Gratings, p53–56, ECOC 97, Sep. 1997, Conf. Pub. 448.

*Primary Examiner*—John Hoffmann

[57] ABSTRACT

Applicants have discovered that exposing optical fiber to an electrical arc produces a perturbation in its refractive index and that gratings can be made by exposing fiber to arcs at a series of locations along its length. In a first variation of the process, the fiber is exposed under tension to a high current arc (>15 mA) for a prolonged period of time (>2 s). Using this method, long period gratings can be successfully fabricated from fiber without the use of special dopants. In a second variation, the fiber is doped and the tension is reduced. The resulting grating is optically weaker but mechanically stronger. A third variation uses hydrogen-sensitized fibers and reduced currents and times. The resulting grating is optically and mechanically strong.

7 Claims, 5 Drawing Sheets

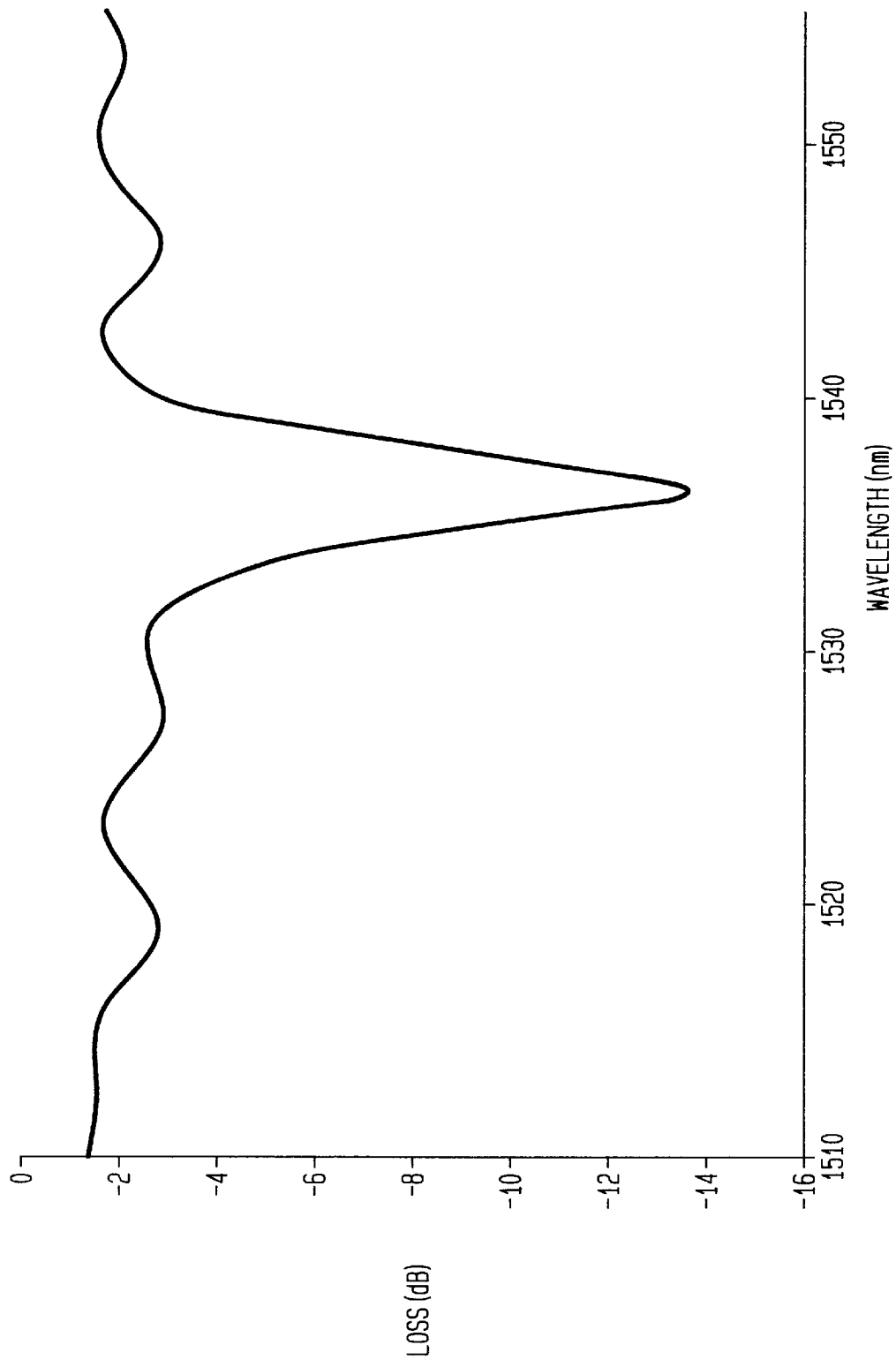

METHOD FOR MAKING LONG-PERIOD FIBER GRATINGS

FIELD OF THE INVENTION

This invention relates to long-period optical fiber gratings and, in particular, to a method for making such gratings by exposing fiber to electric arcs.

BACKGROUND OF THE INVENTION

Long-period fiber grating devices provide wavelength-dependent loss. Such gratings couple optical power between two copropagating modes with very low back reflection. They typically comprise a length of optical fiber wherein a plurality of refractive index perturbations are spaced along the fiber by a periodic distance $\Lambda$. In contrast with conventional Bragg gratings, long-period gratings utilize a periodic spacing $\Lambda$ which is typically at least 10 times larger than the transmitted wavelength $\lambda$, i.e. $\Lambda \geq 10\lambda$. Typically $\Lambda$ is in the range 15–1500 micrometers, and the width w of a perturbation is in the range $\frac{1}{5}\Lambda$ to $\frac{4}{5}\Lambda$. In some applications, such as chirped gratings, $\Lambda$ can vary along the length of the grating.

Long-period fiber grating devices selectively remove light at specific wavelengths by mode conversion. In contrast with conventional Bragg gratings which reflect light, long-period gratings remove light without reflection by converting it from a guided mode to a non-guided mode or by converting it from one guided mode to another. The spacing $\Lambda$ of the perturbations is chosen to shift transmitted light in the region of a selected peak wavelength $\lambda_p$ from a guided mode into a nonguided mode, thereby reducing in intensity a band of light centered about $\lambda_p$. Alternatively, $\Lambda$ can be chosen to shift light from one guided mode to a second guided mode (typically a higher order mode).

Long-period grating devices are thus useful as filtering and spectral shaping devices in a variety of optical communications applications. Key applications include spectral shaping for high-power broadband light sources (C. W. Hodgson et al., 9 *Optical Society of America Technical Digest Series*, Paper TuG3 (1996)), gain equalization for optical amplifiers (A. M. Vengsarkar et al., 21 *Optics Letters* 336, (1996)), band rejection in cascaded high-power Raman lasers (S. G. Grubb et al., *Laser Focus World*, p. 127 (February 1996)), and filtering amplified spontaneous emission in erbium doped amplifiers (A. M. Vengsarkar et al., 14 *J. Lightwave Technol.* 58 (1996)).

While a variety of methods have been used to make long period gratings, most such methods require specially doped fibers and expensive equipment such as ultraviolet lasers. The most popular technique involves fabricating fibers doped to exhibit ultraviolet light photosensitivity and exposing the fiber at periodic regions along its length to high intensity ultraviolet light. See Hill et al., U.S. Pat. No. 5,131,069, Hill et al., U.S. Pat. No. 5,216,739 and Vengsarkar, U.S. Pat. No. 5,430,817. The method can be enhanced by heat, and alternatively, gratings can be written by heat in combination with hydrogen sensitization. See Lemaire et al., U.S. Pat. No. 5,478,371 and Atkins et al., U.S. Pat. No. 5,500,031, respectively.

Another method described by Poole et al. in U.S. Pat. No. 5,411,566 uses a two step process. In the first step a focused $CO_2$ laser is used to make periodic grooves on the fiber surface by ablation, and in the second step the ablated fiber is annealed so that the material imbalance created by the periodic ablations is transferred to the core-cladding interface. With this process, annealing the fiber in the regions of the cuts transforms the corrugations on the fiber surface to permanent deformations of the core. See Poole, col. 2, lines 53–58 and col. 4, lines 26–27. The result is a periodic change in the effective index of a mode traveling in the fiber.

Despite these various methods, there remains a need for a simpler, less expensive method for making long period fiber gratings.

SUMMARY OF THE INVENTION

Applicants have discovered that exposing optical fiber to an electrical arc produces a perturbation in its refractive index and that gratings can be made by exposing fiber to arcs at a series of locations along its length. In a first variation of the process, the fiber is exposed under tension to a high current arc (>15 mA) for a prolonged period of time (>2 s). Using this method, long period gratings can be successfully fabricated from fiber without the use of special dopants. In a second variation, the fiber is doped and the tension is reduced. The resulting grating is optically weaker but mechanically stronger. A third variation uses hydrogen-sensitized fibers and reduced currents and times. The resulting grating is optically and mechanically strong.

BRIEF DESCRIPTION OF THE DRAWINGS

The advantages, nature and various additional features of the invention will appear more fully upon consideration of the illustrative embodiments now to be described in connection with the accompanying drawings. In the drawings:

FIGS. 4–7 are transmission spectra of long-period gratings made by the method of FIG. 1.

It is to be understood that these drawings are for purposes of illustrating the concepts of the invention and, except for the graphs, are not to scale.

DETAILED DESCRIPTION

Figure 1:
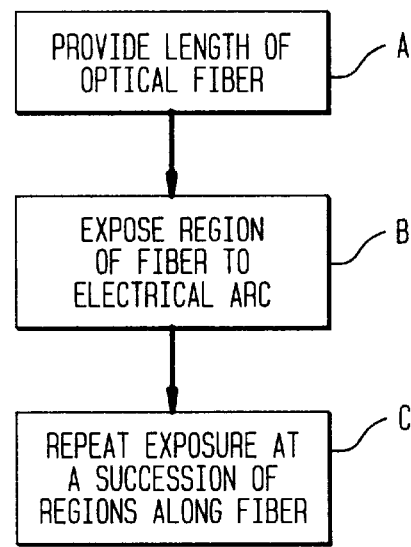
FIG. 1 is a block diagram of the steps in making a long-period grating.

Referring to the drawings, FIG. 1 is a block diagram of the steps in a making a long-period grating. The first step, as shown in block A, is to provide a length of optical fiber. For different variations of this process, the fiber can be doped or undoped and hydrogen-sensitized or not. A preferred fiber for this method is conventional dispersion-shifted fiber having a core doped with approximately 10 mole % germania, a mode field diameter of 8.25 $\mu$m (at a wavelength of 1.55 $\mu$m) and a cladding diameter of 125 $\mu$m.

Figure 2:
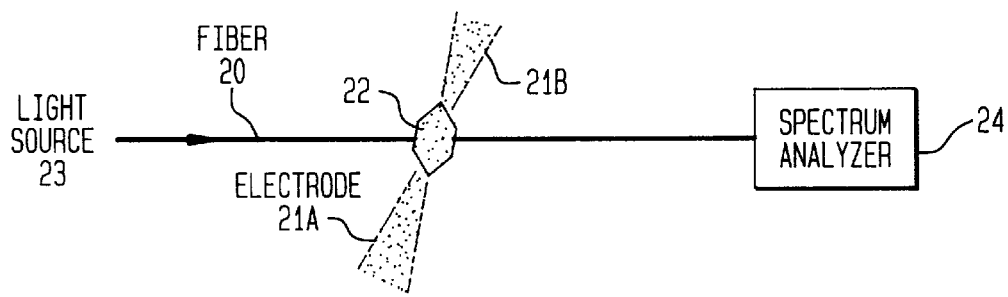
FIG. 2 is a schematic view of apparatus useful in practicing the method of FIG. 1.

The next step shown in block B of FIG. 1 is to expose the fiber to an electrical arc. This step can be better understood by reference to FIG. 2 which schematically illustrates apparatus useful in practicing the method of FIG. 1. As can be seen in FIG. 1, the step of exposing the fiber to the electrical arcs is performed immediately after the step of providing the length of the fiber. The fiber core may contain dopants or molecular hydrogen, as further explained below. As illustrated in FIG. 2, an optical fiber 20 having an outer surface that is substantially smooth, i.e., free of intended cuts or ablations, is disposed substantially transversely between a pair of electrodes 21A and 21B. In other words, the outer cladding and/or outer polymer layer is not abraded, etched, lased, annealed, or otherwise cut. The electrodes, which are conveniently pointed tungsten rods, are switchably connected to a current source (not shown) for driving an arc 22 between them. The fiber 20 is preferably held midway between the two electrodes by fiber holders (not shown) controlled by motorized stages. While not necessary for the invention, in applicant's initial experiments, an optical signal from a broadband light source 23 was applied to one end of the fiber, and the other end of the fiber provided the input to a spectrum analyzer 24. In preferred apparatus the electrodes were tungsten containing a minor amount of thorium, the point angle was 28° and the gap separation was 2.54 mm. Aside from the fiber, the gap contained air at room temperature and pressure.

The third step (block C) is to repeat the exposure at a succession of regions along the fiber length. This can be accomplished by switching off the arc 23, advancing the fiber in the holders and switching the arc on. This process is continued for several times until the number of perturbed regions produces a grating of desired strength (typically 5–20 exposures are adequate). It should be understood that one is not confined to a single pair of electrodes. Plural electrode pairs can be used to simultaneously make a plurality of gratings and, with appropriate fine spacing, a plurality of electrode pairs can simultaneously expose a plurality of locations in the same grating.

Figure 3:
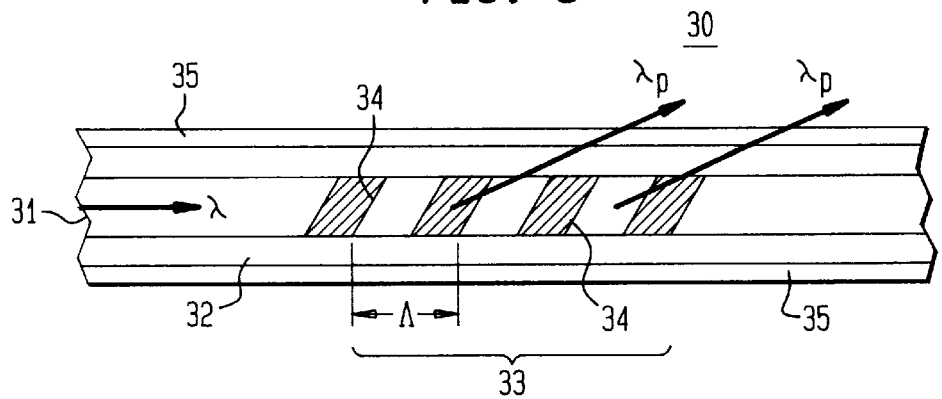
FIG. 3 is a schematic cross section of a long-period grating made by the method of FIG. 1.

FIG. 3 is a schematic cross section of the resulting long-period grating device. The device comprises a length of optical fiber 30 comprising core 31 surrounded by a cladding 32 having an index of refraction lower than the index of core 31. The cladding 32 can be a composite cladding having a substantially smooth outer surface, as illustrated in FIG. 3.

The core 31 includes one or more long period gratings 33, each comprising a plurality of index perturbations 34 of width w spaced apart by a periodic distance $\Lambda$ where, typically, 15 $\mu m \leq \Lambda \leq 1500$ $\mu m$. Advantageously +e,fra 1/+ee $\Lambda \leq w \leq \frac{4}{5}\Lambda$ and preferable $w = \frac{1}{2}\Lambda$. The perturbations preferably form an angle $\theta$ ($2° \leq \theta < 90°$) with the longitudinal axis of the fiber. The fiber is to transmit broadband light of wavelength centered about $\lambda$. After processing, the fiber is typically coated with a protective polymeric coating 35.

The spacing $\Lambda$ of the perturbations is chosen to shift transmitted light in the region of a selected wavelength $\lambda_p$ from a guided mode into a non-guided mode, thereby reducing in intensity a band of light entered about $\lambda_p$. A non-guided mode is a mode which is not propagated coherently in the core. It is typically a cladding mode, a radiation mode or, in the case of multilayer profiles, a ring mode. Alternatively, the spacing can be chosen to shift light from one guided mode into a different guided mode whereby the light can be separately processed.

The spacing $\Lambda$ is generally chosen to remove light at a specified wavelength $\lambda_p$. The phase matching condition between the guided mode and the forward propagating cladding modes is given by $\beta_{01} - \beta_{cl}^{(m)} = 2\pi/\Lambda$. By recasting this phase matching condition one can express the peak wavelength of mode coupling as $\lambda = \Lambda(n_{01} - n^{(m)}) = \Lambda \Delta n$, where $n_{01}$ and $n^{(m)}$ are the effective indices of the fundamental mode and the HEim cladding mode, respectively, and $\Delta n$ is the differential effective index. This provides the designer with a characteristic calibration curve to determine the fiber periodicity for a desired peak wavelength.

Figure 4:
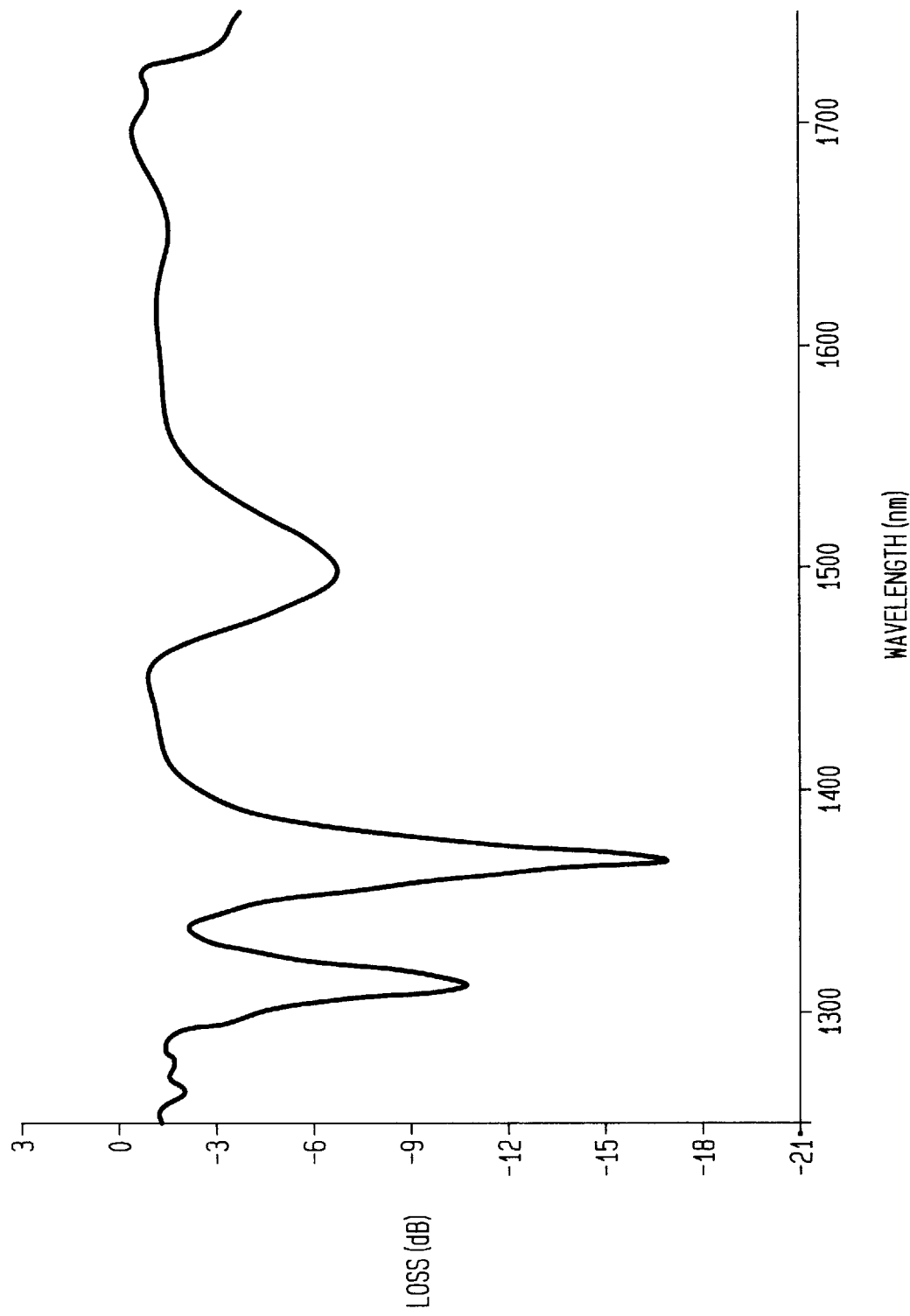

The extent of exposure to the arc can be considered in three variations. In a first variation the fiber is exposed under conditions that can produce a local physical deformation in the fiber. Specifically, the fiber is placed under slight tension and exposed to a high current arc (>15 mA) for a prolonged period of time ($\geq 1$ s). This variation forms index perturbations that are symmetric with respect to the fiber axis, leading to coupling between azimuthally symmetric modes. It has the added advantage that long period gratings can be fabricated in optical fiber without dopants. The physical deformation takes the form of periodic reductions in the diameter of the fiber (necking) where the fiber was exposed to the arc. FIG. 4 shows the transmission spectrum of a fiber exposed in this manner at 20 periodically spaced locations along its length.

Figure 5:
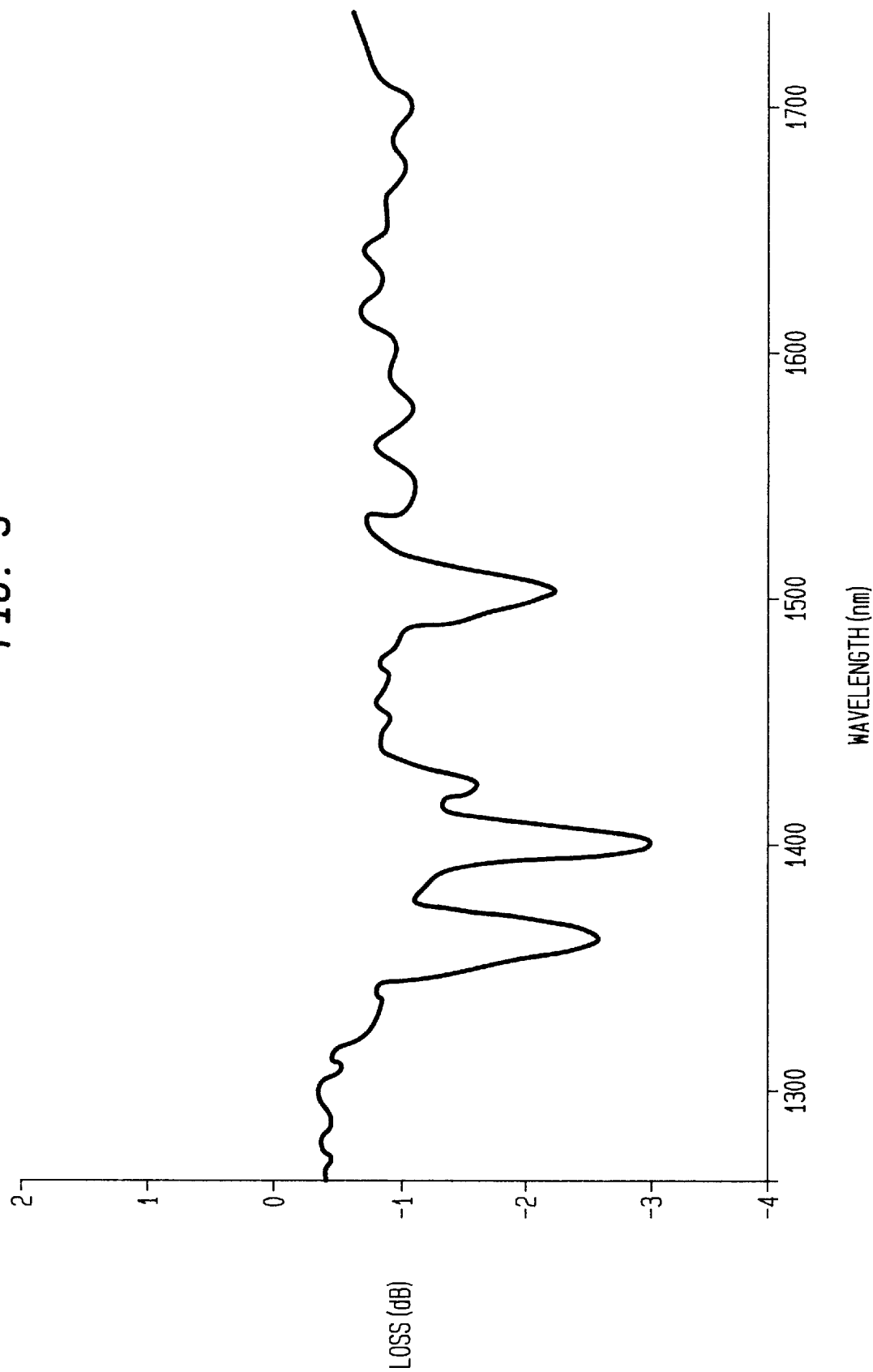

In a second variation, the fiber is doped but need not be under tension. The arc current and time are chosen so as not to physically deform the fiber but to locally redistribute the dopants. The arc current is typically greater than 15 mA and the exposure time can be less than 1 s. The effect of the arc is to modify the mode-field diameter of the mode propagating in the fiber, leading to coupling between azimuthal modes, which is weaker than in the first variation. The resulting gratings are particularly useful for applications where low coupling is desirable as in gratings for equalizing the gain of erbium-doped fiber amplifiers. Another advantage of this variation, as compared with the first variation, is that the gratings are mechanically stronger because they are not physically deformed. FIG. 5 shows the transmission spectrum of a typical grating made by the second variation.

Figure 6:
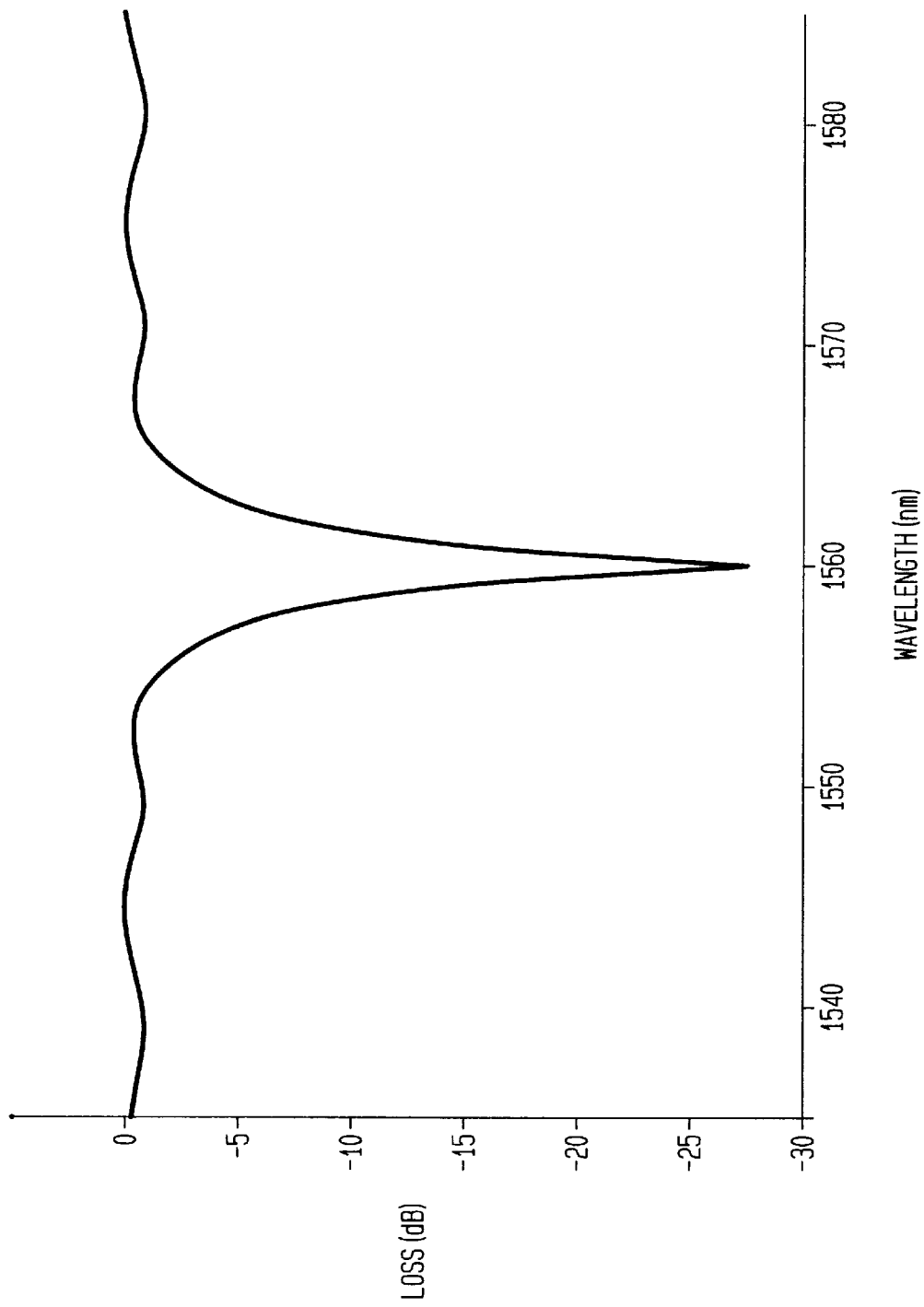

In a third variation the optical fiber is loaded with molecular hydrogen before exposure to the arc, typically in an amount greater than 0.5 mole %. Exposure can then be effected with even lower arc currents (less than 14 mA) and exposure times (less than 2 s) than are used in the second variation. The exposure of hydrogen-sensitized fibers results in a dramatic increase in the refractive index of the fiber core and creates a grating in the core. The resulting gratings exhibit very strong coupling between co-propagating modes. Such gratings are ideally suited for filtering out unused light at undesirable wavelengths as in Raman amplifiers and in filtering amplified spontaneous emission in rare-earth doped fiber amplifiers. This process is also the preferred choice for coupling between two guided modes over a broad wavelength range. FIG. 6 shows the transmission spectrum of a typical grating made by the third variation.

The spacing between perturbations need not be precisely periodic in the case of chirped gratings. For chirped gratings, as the fiber is advanced through the electrodes, the duty cycle is changed to create a chirped grating. The effect of chirping is to widen the band of wavelengths transformed, as illustrated in FIG. 7. The electrodes can also be staggered to create a blaze in the grating and thus enhance coupling between modes that are disparate in azimuthal symmetry.

The invention can be better understood by reference to the following specific examples:

EXAMPLE 1

(Variation 1)

A conventional dispersion-shifted fiber a core with approximately 10% germania, mode field diameter 8.25 $\mu m$ (at a wavelength of 1.55 $\mu m$) and cladding diameter 125 $\mu m$ was used in the experiment. The coating was stripped over a fiber of length 50 mm and the fiber was aligned in fiber holders such that the uncoated fiber was centrally located between two electrodes. The electrodes were made out of tungsten. The fiber holders were controlled by motorized stages to ensure an accurate movement of the fiber to within + or −0.1 $\mu m$. An arc was created between the electrodes by passing a current of 16.3 mA causing approximately 200 $\mu m$ of the fiber to be exposed to the arc. After an exposure time of 2 s, the fiber (under slight tension corresponding to about 1% strain) was moved 500 μm and the process was repeated 18 times. A broadband optical signal was transmitted through the fiber during the above process and the transmitted spectrum was monitored. A wavelength-dependent-loss was observed after about 5 exposures and the loss grew to about 16 dB at the end of 18 exposures. This spectrum is shown in FIG. 4.

EXAMPLE 2

(Variation 2)

The same structure fiber was processed the same as in Example 1 except that the fiber was under no tension, the arc current was 16.9 mA and the exposure time was 4 s. The spectrum is shown in FIG. 5.

EXAMPLE 3

(Variation 3)

The same structure fiber as in Example 2 was loaded with 2.5% molecular hydrogen and then processed the same as Example 1 except that the arc current was 3.5–4.0 mA and the exposure time was 0.3 s. The spectrum is shown in FIG. 6.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A method of making an optical fiber grating comprising the steps of:

providing a length of optical fiber having a core containing hydrogen and a cladding surrounding the core, the length of optical fiber being free of intended cuts; and exposing said length of fiber to an electrical arc at a plurality of regions along said length of fiber, thereby exposing said length of fiber to a plurality of electric arcs, so that said exposing of said length of fiber to said plurality of electric arcs causes an increase in the refractive index of the core at each of said plurality of regions, thereby forming said grating without cuts having been placed in said length of fiber.

2. The method of claim 1, wherein said exposing of said length of fiber to an electric arc at said plurality of regions along said length of fiber comprises disposing said length of fiber between a pair of electrodes, longitudinally moving said length of fiber so that each one of said regions is successively disposed between said pair of electrodes, and forming the arc between said electrodes at each one of said regions.

3. The method of claim 1, wherein said exposing of said length of fiber to an electric arc at said plurality of regions along said length of fiber comprises providing a pair of electrodes, disposing said length of fiber between said electrodes, and forcing a current between said electrodes to form an electric arc at each one of said regions.

4. The method of claim 1, wherein the fiber is loaded with molecular hydrogen in an amount of about 0.5 or more mole percent hydrogen.

5. The method of claim 1, wherein said exposing of said fiber to an electric arc comprises providing a pair of electrodes, disposing said length of fiber between said electrodes, and forcing a current between said electrodes to form an electric arc at each one of said regions, said current being greater than 14 mA applied for one or more seconds at each of the plurality of regions.

6. The method of claim 1 in which said step of exposing comprises exposing said fiber to an electric arc at each one of said plurality of regions by forcing a current between said electrodes, said current being sufficiently low and applied for a sufficiently short exposure time so as not to physically deform the fiber.

7. The method of claim 6 in which the current is applied at less than 14 mA and for a time of less than two seconds.

* * * * *